(12) United States Patent
Huddersman (10) Patent No.: US 9,174,208 B2
(45) Date of Patent: *Nov. 3, 2015

(54) FIBROUS CATALYST

(75) Inventor: Katherine Huddersman, Leicester (GB)

(73) Assignee: De Montfort University (GB)

( * ) Notice: Subject to any disclaimer, the term of this patent is extended or adjusted under 35 U.S.C. 154(b) by 731 days.

This patent is subject to a terminal disclaimer.

(21) Appl. No.: 12/674,884

(22) PCT Filed: Aug. 22, 2008

(86) PCT No.: PCT/GB2008/002876
§ 371 (c)(1),
(2), (4) Date: Jan. 12, 2011

(87) PCT Pub. No.: WO2009/027655
PCT Pub. Date: Mar. 5, 2009

(65) Prior Publication Data
US 2011/0098174 A1    Apr. 28, 2011

(30) Foreign Application Priority Data
Aug. 25, 2007    (GB) .................... 0716620.0

(51) Int. Cl.
| | |
|---|---|
| *B01J 31/06* | (2006.01) |
| *B01J 37/00* | (2006.01) |
| *B01J 35/06* | (2006.01) |
| *B01J 23/745* | (2006.01) |
| *B01J 23/78* | (2006.01) |
| *B01J 37/02* | (2006.01) |
| *B01D 53/86* | (2006.01) |
| *B01J 23/755* | (2006.01) |

(52) U.S. Cl.
CPC .............. *B01J 35/06* (2013.01); *B01J 23/745* (2013.01); *B01J 23/78* (2013.01); *B01J 37/0207* (2013.01); *B01D 53/86* (2013.01); *B01D 2251/102* (2013.01); *B01D 2251/106* (2013.01); *B01D 2255/90* (2013.01); *B01J 23/755* (2013.01); *B01J 31/06* (2013.01)

(58) Field of Classification Search
CPC ........ B01J 23/745; B01J 23/755; B01J 35/06; B01J 37/0207; B01J 31/06; B01D 2251/102; B01D 2251/106; B01D 2255/90; B01D 53/86; B01H 23/78
USPC ......................................................... 502/159
IPC .................................. B01J 31/06, 35/06, 37/00
See application file for complete search history.

(56) References Cited

U.S. PATENT DOCUMENTS 2,985,502 A * 5/1961 Kronsbein et al. ................ 8/150
3,872,027 A * 3/1975 Christmann et al. .......... 502/324

FOREIGN PATENT DOCUMENTS

GB          2346569 A  *  8/2000  ............... B01J 35/06

*Primary Examiner* — Jun Li
(74) *Attorney, Agent, or Firm* — Schwegman Lundberg & Woessner, P.A.

(57) ABSTRACT

The present invention provides a method for preparing a fibrous catalyst for the treatment of a waste stream, the method comprising the steps of: (i) treating a fabric comprising polyacrylonitrile fibers with a hydrazine salt and a hydroxylamine salt in the presence of a base to provide a modified fabric; (ii) treating the modified fabric with a base; and (iii) treating the modified fabric with an aqueous solution comprising a sulfate salt of a first metal cation and a salt of a second metal cation, wherein the first metal cation is selected from an iron and nickel cation, and mixtures thereof, and wherein the second metal cation is selected from a lithium, sodium, potassium, rubidium, caesium, beryllium, magnesium, calcium, strontium, barium, zinc, cadmium, mercury, aluminum, gallium, indium, thallium, tin, lead, antimony and bismuth cation, and mixtures thereof.

12 Claims, 1 Drawing Sheet

FIBROUS CATALYST

RELATED APPLICATIONS

This application is a nationalization under 35 U.S.C. 371 of PCT/GB2008/002876, filed Aug. 22, 2008 and published as WO 2009/027655 A2 on Mar. 5, 2009, which claimed priority under U.S.C. 119 to United Kingdom Application No.: 0716620.0, filed on Aug. 25, 2007, which applications and publication are incorporated herein by reference and made a part hereof.

The present invention relates to novel methods for preparing fibrous catalysts.

The processes conducted in many industries, such as the chemical, pharmaceutical, petroleum chemical, photo-processing, pulp, leather, agro-chemical, furniture manufacturing and textile industries, produce waste streams that contain undesired compounds, for example that may be harmful to the environment. For example, waste streams that are produced in the textile industry (for example in dyeing and finishing processes) and that are produced in the pulp and leather industries may contain undesired compounds such as sulfides, dyes, phenols, nonylphenols, surfactants and other organic compounds. Waste streams that are produced in the photo-processing industry may contain undesired compounds such as amines, aminophenols, phenylenediamines, triethanolamine, ethylenediaminetetraacetic acid and other organic compounds. It is advantageous to treat these waste streams, so as to substantially remove the undesired compounds before further treatment and/or disposal or use.

Undesired organic compounds, such as those discussed above, may substantially be removed from waste streams by oxidative decomposition. This converts the undesired organic compound(s) into derivatives of these compounds which may then be more easily disposed of or, if appropriate, isolated and collected for use elsewhere.

The oxidative decomposition of an organic compound may be conducted by reaction with a transition metal cation and an oxidant, such as hydrogen peroxide or oxygen. This reaction is known as "Fentons chemistry" (see, for example, Advanced Inorganic Chemistry, Cotton, Wilkinson, Murrillo and Bochmann, John Wiley and Sons, 1999, 6$^{th}$ edition, pages 458 and 459). Any transition metal cation that can easily undergo redox reaction to another oxidation state can participate in the Fentons chemistry reaction. For example, when the transition metal is iron, the iron cation $Fe^{2+}$ may react with hydrogen peroxide and be oxidised to form the $Fe^{3+}$ cation as well as a hydroxide anion and a hydroxyl radical. The hydroxyl radical can then act as an oxidising agent, for example to oxidise an organic compound. Non-transition metal cations cannot participate in the Fentons chemistry reaction because they have only one oxidation state.

The source of transition metal cations for use in such an oxidative decomposition reaction may be in the form of a homogeneous or a heterogeneous catalyst. Additionally, fibrous catalysts have been suggested. Fibrous catalysts are catalysts comprised of polymer fibres to which catalytically active sites or centres are attached.

For example, GB-A-1,436,245 discloses fibrous catalysts for the oxidation of carbon monoxide and processes for preparing the catalysts. The catalysts comprise activated carbon fibres that support noble metals such as palladium, ruthenium, rhodium and platinum, or compounds thereof.

RU-A-2118908 discloses a textile fibrous bulked catalyst made in the form of a fabric including a carrier layer made from single filaments and modified ion-containing complex threads of polyacrylonitrile filaments including one or more ions of metal of variable valence.

GB-A-2,346,569 discloses methods for producing a fibrous catalyst. One method comprises the steps of treating a knitted fabric consisting of an inert filament and complex polyacrylonitrile (hereinafter referred to as "PAN") threads with a hot alkaline solution of hydrazine hydrochloride and then with an aqueous transition metal salt solution. As the skilled person would appreciate, the reference to "complex threads" means that a number of threads are twisted together, i.e. not a monofilament. Another method comprises the steps of treating a fabric comprising PAN threads with an alkaline solution of a hydrazine salt, a hydroxylamine salt and sodium nitrite and then with a solution containing at least one transition metal salt.

RU-2266304 discloses catalysts for waste water and emission gas treatment. The catalysts are prepared by treating a knitted fabric consisting of polyacrylonitrile monothreads and complex threads with a modifying solution of a chlorine-containing hydrazine salt and a chlorine-containing hydroxylamine salt and then with transition metal salts.

WO-2007/099293 (International patent application number PCT/GB2007/000612; published after the priority date of the present application) describes a method for producing a fibrous catalyst. The method comprises the steps of modifying a fabric comprising PAN fibres by treatment with a hydrazine salt and a hydroxylamine salt in the presence of a base and then by treatment with a base, and then impregnating the modified fabric with a transition metal by treatment with an aqueous solution comprising a salt of a transition metal cation and a salt of a non-transition metal cation, wherein the non-transition metal cation is selected from the main Group metals. Specific examples of aqueous solutions used in the impregnation step of the method described in WO-2007/099293 are aqueous solutions comprising iron chloride in combination with calcium nitrate, magnesium nitrate, lithium sulfate or zinc sulfate.

The applicants have surprisingly found however that the selection of a sulfate salt of a transition metal cation, i.e. the selection of a sulfate salt of iron or nickel, in the impregnation step of a method for producing a fibrous catalyst increases the loading of the iron or nickel onto the PAN fibres, which in turn provides an improved fibrous catalyst that is efficient at removing undesired compounds from a range of waste streams and/or that has an extended lifetime.

According to one aspect of the present invention there is provided a method for preparing a fibrous catalyst for the treatment of a waste stream, the method comprising the steps of:

(i) treating a fabric comprising polyacrylonitrile fibres with a hydrazine salt and a hydroxylamine salt in the presence of a base to provide a modified fabric;

(ii) treating the modified fabric with a base; and (iii) treating the modified fabric with an aqueous solution comprising a sulfate salt of a first metal cation and a salt of a second metal cation, wherein the first metal cation is selected from an iron and nickel cation, and mixtures thereof, and wherein, the second metal cation is selected from a lithium, sodium, potassium, rubidium, cesium, beryllium, magnesium, calcium, strontium, barium, zinc, cadmium, mercury, aluminium, gallium, indium, thallium, tin, lead, antimony and bismuth cation, and mixtures thereof.

As discussed herein, the applicants have surprisingly found that the selection of sulfate salts of iron and/or nickel in the step (iii) of the method increases the loading of the iron and/or nickel onto the PAN fibres, which in turn provides an improved fibrous catalyst that is efficient at removing undesired compounds from a range of waste streams and/or that has an extended lifetime.

In one aspect of the invention, the first metal cation is an iron cation. Thus, there is provided a method for preparing a fibrous catalyst for the treatment of a waste stream, the method comprising the steps of:

(i) treating a fabric comprising polyacrylonitrile fibres with a hydrazine salt and a hydroxylamine salt in the presence of a base to provide a modified fabric;
(ii) treating the modified fabric with a base; and
(iii) treating the modified fabric with an aqueous solution comprising a sulfate salt of an iron cation and a salt of a second metal cation, wherein the second metal cation is selected from a lithium, sodium, potassium, rubidium, cesium, beryllium, magnesium, calcium, strontium, barium, zinc, cadmium, mercury, aluminium, gallium, indium, thallium, tin, lead, antimony and bismuth cation, and mixtures thereof.

In another aspect of the invention, the first metal cation is a nickel cation. Thus, there is provided a method for preparing a fibrous catalyst for the treatment of a waste stream, the method comprising the steps of:

(i) treating a fabric comprising polyacrylonitrile fibres with a hydrazine salt and a hydroxylamine salt in the presence of a base to provide a modified fabric;
(ii) treating the modified fabric with a base; and
(iii) treating the modified fabric with an aqueous solution comprising a sulfate salt of a nickel cation and a salt of a second metal cation, wherein the second metal cation is selected from a lithium, sodium, potassium, rubidium, cesium, beryllium, magnesium, calcium, strontium, barium, zinc, cadmium, mercury, aluminium, gallium, indium, thallium, tin, lead, antimony and bismuth cation, and mixtures thereof.

For the avoidance of doubt, by the term "fibrous catalyst" we mean a catalyst that comprises polymer fibres to which catalytically active sites or centres are attached. By the term "fibres" we include both a single monofilament and a complex filament that is made up of more than one monofilament.

In step (i) of the method of the present invention, the fabric is "modified". This modification is a result of several reactions that occur between the nitrile groups of the PAN fibres and the reagents used in step (i). For example, it is believed that the nitrite groups of the PAN fibres are converted into functional groups that are able to form complexes at least with the iron and/or nickel cations. It is believed that some of the nitrile groups of the PAN fibres react with the hydrazine salt so as to produce amino and amido groups and that some of the nitrile groups are hydrolysed so as to produce carboxyl groups. Thus, a cross-linked, amino-amido-carboxyl ion-exchange material is formed which is able to absorb iron and/or nickel cations to form complexes at least with the iron and/or nickel cations, which complexes act as catalytic active sites. Additionally, it is believed that some of the nitrile groups of the PAN fibres react with the hydroxylamine salt to produce amidoxime groups, which amidoxime groups are then hydrolysed to form products having a complex structure including carboxyl and hydroxamic acid groups as well as glutarimine and other cyclic groups. This is believed to aid the fixing of the iron and/or nickel cations to the PAN fibres.

As the skilled person would appreciate, any suitable hydrazine salt may be used in step (i) of the method of the present invention. For example, suitable hydrazine salts include hydrazine dihydrochloride, hydrazine monohydrochloride, hydrazine hydrate, hydrazine monohydrobromide, hydrazine acetate, hydrazine sulfate and dihydrazine sulfate, and mixtures thereof. In particular, suitable hydrazine salts include hydrazine sulfate and dihydrazine sulfate, and mixtures thereof. Even more particularly the hydrazine salt is dihydrazine sulfate. As the skilled person would appreciate, one or more hydrazine salts may be used in step (i), as appropriate.

As the skilled person would appreciate, any suitable hydroxylamine salt may be used in step (i) of the method of the present invention. For example, suitable hydroxylamine salts include hydroxylamine monohydrochloride, hydroxylamine sulfate and hydroxylamine phosphate, and mixtures thereof. In particular, the hydroxylamine salt is hydroxylamine sulfate. As the skilled person would appreciate, one or more hydroxylamine salts may be used in step (i), as appropriate.

In particular, in step (i) of the method of the present invention, the hydrazine salt may be selected from hydrazine sulfate and dihydrazine sulfate, and mixtures thereof, and the hydroxylamine salt may be hydroxylamine sulfate. For example, in one aspect, the hydrazine salt is dihydrazine sulfate and the hydroxylamine salt is hydroxylamine sulfate. It is believed that the use of sulfate salts of hydrazine and/or hydroxylamine in step (i) of the method of the present invention helps to improve the modification of the PAN fibres and so also the fixing of the iron and/or nickel cation(s) thereto. Additionally, the sulfate salts are advantageous for industrial production of the fibrous catalyst due to less corrosion effects on reactors (such as stainless steel reactors), for example as compared to other salts such as chlorides.

In step (i) of the method of the present invention, salts of hydrazines containing from one to four substituents may be used, which substituents may be the same or different and selected from (1-4C)alkyl, aryl (such as phenyl) and (1-4C)alkanoyl and which substituents may be further substituted for example by one or more further substituents which may be the same or different selected from halogen, nitro and hydroxyl. Salts of hydroxylamines containing one or two substituents may be used which substituents may be the same or different and selected from (1-4C)alkyl, aryl (such as phenyl) and (1-4C)alkanoyl and which substituents may be further substituted for example by one or more further substituents which may be the same or different selected from halogen, nitro and hydroxyl. Thus, references herein to hydrazine salts include references to salts of hydrazine (i.e. $N_2H_4$) itself as well as salts of derivatives of hydrazine, i.e. which derivatives include substituents as discussed above on the nitrogen atom(s) of the hydrazine (i.e. in place of hydrogen atom(s)). Similarly, references herein to hydroxylamine salts include references to salts of hydroxylamine (i.e. $NH_2OH$) itself as well as salts of derivatives of hydroxylamine, i.e. which derivatives include substituents as discussed above on the nitrogen and/or oxygen atom(s) of the hydroxylamine (i.e. in place of hydrogen atom(s)). Preferably, however, the hydrazine and hydroxylamine salts include no such substituents.

In step (i) of the method of the present invention, the fabric comprising PAN fibres typically is treated with a solution of a hydrazine salt and a hydroxylamine salt in a suitable solvent and in the presence of a suitable base. Typically, an aqueous solution of the hydrazine salt and the hydroxylamine salt is used. The concentration of the hydrazine salt used in step (i) may be in the range of from 10 to 50 g/l, particularly in the range of from 20 to 40 g/l, more particularly about 30 g/l. The concentration of the hydroxylamine salt used in step (i) may be in the range of from 14 to 70 g/l, particularly in the range of from 30 to 55 g/l, more particularly about 42 g/l. Typically, the hydrazine salt and hydroxylamine salt may be present in the solution in a molar ratio in the range of from about 1:1 to about 1:3, preferably of about 1:2

Typically, in step (i) of the method of the present invention, the weight ratio of PAN fibres to total hydroxylamine salt may be in the range of from about 1:8 to 1:0.5, preferably in the range of from about 1:6 to about 1:2, more preferably in the range of from about 1:4 to about 1:2, even more preferably of about 1:2.7. The weight ratio of PAN fibres to total hydrazine salt may be in the range of from about 1:7 to 1:0.15, preferably in the range of from about 1:4 to about 1:1, more preferably in the range of from about 1:3 to about 1:1.5, even more preferably of about 1:1.9.

Any suitable base may be used in step (i) of the method of the present invention. For example, a suitable base may be selected from sodium hydroxide, potassium hydroxide and sodium carbonate, and mixtures thereof (particularly sodium hydroxide). The base is used in step (i) to maintain a suitable pH, i.e. at which modification of the fabric may occur. A suitable pH is, for example, a pH in the range of from 6.5 to 12, particularly a pH in the range of from 8.5 to 11 and more particularly a pH of about 9.5. The step (i) may conveniently be conducted at a temperature of greater than 60° C., such as greater than 80° C., particularly at a temperature in the range of from 90 to 130° C., more particularly at a temperature in the range of from 95 to 105° C., for example at a temperature of about 98 to 102° C.

The reaction of step (i) may be monitored by any suitable means, such as by infra-red spectroscopy. For example, the reduction in the intensity of or the disappearance of the nitrile peak may be monitored by infra-red spectroscopy. A typical treatment time is from about 30 minutes to 3 hours, suitably about 2 hours. Typically, at least 60% of the PAN fibres are modified after reaction for about two hours under the reaction conditions discussed above for step (i).

In step (ii) of the method of the present invention, the modified fabric produced in step (i) is treated with an additional base prior to conducting step (iii). It is believed that step (ii) converts those nitrile groups that remain after step (i) into carboxyl groups, which carboxyl groups are able to absorb transition metal cations to form complexes with the iron and/or nickel cations. In other words, the fabric is further modified in step (ii). Thus, references herein to "modified fabric" are intended to refer to fabric comprising modified PAN fibres, i.e. wherein the PAN fibres have been subjected to steps (i) and/or (ii) (suitably steps (i) and (ii)) of the method of the present invention.

As the skilled person would appreciate, any suitable base may be used in step (ii). For example, a suitable base may be selected from sodium hydroxide, potassium hydroxide and sodium carbonate, and mixtures thereof (such as a sodium hydroxide solution with a concentration in the range of from 10 to 100 g/l, particularly in the range of from 20 to 40 g/l). The same or different base may be used in steps (i) and (ii) of the method of the present invention. The base may be used in the form of a solution, for example an aqueous solution. The base is used in step (ii) to further modify the fabric and create more ligands for the metal cations. The base may be used to provide a pH in the range, for example, of from 6.5 to 14, particularly a pH of from 8 to 14. Suitable treatment times for step (ii) may be in the range of from 30 seconds to 60 minutes, particularly in the range of from 5 to 30 minutes.

The step (ii) may conveniently be conducted at a temperature of greater than ambient temperature, particularly at a temperature in the range of from 25 to 130° C., more particularly at a temperature in the range of from 50 to 110° C., for example at a temperature of about 60° C. A temperature of about 60° C. for step (ii) is believed to be advantageous in a commercial process because it provides easier handling conditions, for example in terms of safety and extended duration of the reaction.

In step (iii) of the method of the present invention, the modified fabric produced in step (ii) is treated with an aqueous solution so as to provide the fibrous catalyst. The aqueous solution typically is an aqueous metal salt solution. The aqueous solution comprises a salt of a first metal cation and a salt of a second metal cation, wherein the first metal cation is selected from an iron and nickel cation, and mixtures thereof, and wherein the second metal cation is selected from a lithium, sodium, potassium, rubidium, cesium, beryllium, magnesium, calcium, strontium, barium, zinc, cadmium, mercury, aluminium, gallium, indium, thallium, tin, lead, antimony and bismuth cation, and mixtures thereof.

As discussed above, in one aspect of the present invention, the first metal cation is an iron cation (for example $Fe^{2+}$ or $Fe^{3+}$, especially $Fe^{3+}$). The $Fe^{3+}$ cation is believed to form more stable complexes to the modified PAN fibres. The sulfate salt of the first metal cation may be a sulfate salt of an iron cation, such as $Fe_2(SO_4)_3.xH_2O$ wherein x is 0 or 1 or $FeSO_4.xH_2O$ wherein x is 0, 1, 4, 5 or 7. Iron sulfate salts are readily available and easily disposed of after use.

As discussed above, in one aspect of the present invention, the first metal cation is a nickel cation (for example $Ni^{2+}$). Thus, the sulfate salt of the first metal cation may be a sulfate salt of a nickel cation, such as $NiSO_4$.

As the skilled person would appreciate, the aqueous solution may, in one aspect, comprise only a sulfate salt of an iron cation or only a sulfate salt of a nickel cation. However, in another aspect, the aqueous solution may comprise both a sulfate salt of an iron cation and a sulfate salt of a nickel cation.

Without wishing to be bound by any theory, the iron and/or nickel cations are believed to form a complex with suitable functional groups on the modified fabric, i.e. comprising the modified PAN fibres as discussed above. The method of the present invention, therefore, provides a fibrous catalyst that comprises a suitable number of iron and/or nickel cations fixed to PAN fibres (i.e. fixed to the modified PAN fibres as described herein).

The second metal cation is selected from a lithium, sodium, potassium, rubidium, cesium, beryllium, magnesium, calcium, strontium, barium, zinc, cadmium, mercury, aluminium, gallium, indium, thallium, tin, lead, antimony and bismuth cation, and mixtures thereof. As the skilled person would appreciate, the second metal cations are cations of the metals belonging to Groups 1, 2, 12, 13, 14 and 15 as set out in the Periodic Table of Elements (according to established IUPAC nomenclature).

Without wishing to be bound by any theory, it is believed that the second metal cations act as facilitators to fix or complex the iron and/or nickel cations to the modified PAN fibres. Typically, the second metal cations are not believed to fix to the modified PAN fibres or to participate directly in any reaction(s) in which the fibrous catalysts are used. However, in some cases, the second metal cation(s) may fix or complex to the modified PAN fibres. For example when the second metal cation is a zinc cation, it is believed that the zinc cation may fix or complex to the modified PAN fibres. As the skilled person would appreciate, the aqueous solution may comprise only one salt of a second metal cation or may comprise a mixture of second metal cation salts.

In one aspect, the second metal cation is selected from a sodium, lithium, potassium, calcium, magnesium and zinc cation, and mixtures thereof. In another aspect, the second metal cation is selected from a sodium, lithium, potassium and calcium cation, more particularly selected from a sodium, potassium and calcium cation, even more particularly selected from a sodium and calcium cation, and mixtures thereof. In another aspect, the second metal cation is selected from a sodium, lithium and potassium cation, and mixtures thereof. In one aspect, the second metal cation is a calcium cation. In another aspect, the second metal cation is a lithium cation. In another aspect, the second metal cation is a sodium cation.

As the skilled person would appreciate, the salts of the second metal cation(s) may comprise any suitable anion(s). Suitable anions include, for example, chlorides, iodides, bromides, fluorides, sulfates, hydrogen sulfates, carboxylates, thiosulfates, thiocyanates, perchlorates, nitrates and nitrites, particularly chlorides, sulfates, nitrates and nitrites, more particularly chlorides, sulfates and nitrates, even more particularly chlorides and sulfates, and mixtures thereof.

Examples of suitable second metal salts include $Ca(NO_3)_2 \cdot 4H_2O$, $CaSO_4 \cdot 0.5H_2O$, $CaSO_4 \cdot 2H_2O$, $CaCl_2$, $CaCl_2 \cdot 2H_2O$, $CaCl_2 \cdot 6H_2O$, $Mg(NO_3)_2 \cdot 6H_2O$, $Li_2SO_4 \cdot H_2O$, $ZnSO_4 \cdot 7H_2O$, $NaCl$, $Na_2SO_4$, $Na_2SO_4 \cdot 10H_2O$, $KCl$, $K_2SO_4$, $LiCl$, $NaNO_3$, $LiNO_3$, $KNO_3$ and/or $Li_2SO_4$, particularly $Ca(NO_3)_2 \cdot 4H_2O$, $CaSO_4 \cdot 0.5H_2O$, $CaSO_4 \cdot 2H_2O$, $CaCl_2$, $Mg(NO_3)_2 \cdot 6H_2O$, $Li_2SO_4 \cdot H_2O$, $ZnSO_4 \cdot 7H_2O$, $NaCl$, $Na_2SO_4$, $Na_2SO_4 \cdot 10H_2O$, $KCl$, $K_2SO_4$, $LiCl$ and/or $Li_2SO_4$, even more particularly $Ca(NO_3)_2 \cdot 4H_2O$, $NaCl$, $Na_2SO_4$ and/or $Na_2SO_4 \cdot 10H_2O$.

In one particular aspect of the invention, the salt of the second metal cation is a sulfate salt. For example, the salt of the second metal cation may be a sulfate salt of sodium, lithium, potassium and/or calcium (especially sodium), such as $CaSO_4 \cdot 0.5H_2O$, $CaSO_4 \cdot 2H_2O$, $Na_2SO_4$, $Na_2SO_4 \cdot 10H_2O$, $K_2SO_4$, $Li_2SO_4$ and/or $Li_2SO_4 \cdot H_2O$ (especially $Na_2SO_4$ and/or $Na_2SO_4 \cdot 10H_2O$).

In another particular aspect of the invention, the salt of the second metal cation is a chloride salt. For example, the salt of the second metal cation may be a chloride salt of sodium, lithium, potassium and/or calcium (especially sodium), such as $CaCl_2$, $CaCl_2 \cdot 2H_2O$, $CaCl_2 \cdot 6H_2O$, $NaCl$, $LiCl$ and/or $KCl$ (especially $NaCl$).

In another particular aspect of the invention, the salt of the second metal cation is a nitrate salt. For example, the salt of the second metal cation may be a nitrate salt of sodium, lithium, potassium and/or calcium (especially sodium), such as $Ca(NO_3)_2 \cdot 4H_2O$, $NaNO_3$, $LiNO_3$ and/or $KNO_3$ (especially $Ca(NO_3)_2 \cdot 4H_2O$).

In particular, the salt of the second metal cation may be a salt selected from sodium chloride (NaCl), calcium nitrate tetrahydrate ($Ca(NO_3)_2 \cdot 4H_2O$) and sodium sulfate ($Na_2SO_4$ and/or $Na_2SO_4 \cdot 10H_2O$), and mixtures thereof. More particularly, the salt of the second metal cation may be a salt selected from sodium chloride (NaCl) and sodium sulfate ($Na_2SO_4$ and/or $Na_2SO_4 \cdot 10H_2O$), and mixtures thereof. In particular, the salt of the second metal cation may be sodium sulfate ($Na_2SO_4$ and/or $Na_2SO_4 \cdot 10H_2O$).

The total metal cation concentration in the aqueous solution may be in the range of from 0.05 g/L to 500 g/L, such as in the range of from 5 g/L to 100 g/L. The molar ratio of the iron and/or nickel sulfate salt to the second metal salt may be in the range of from 1:1 to 1:12, particularly in the range of from 1:1 to 1:9, more particularly in the range of from 1:2 to 1:6, even more particularly in the range of from 1:3 to 1:6.

The step (iii) may conveniently be conducted at a temperature in the range of from 5 to 80° C., preferably at ambient temperature, i.e. a temperature in the range of from 10 to 30° C., particularly in the range of from 20 to 30° C., for example about 25° C. The step (iii) may conveniently be conducted at a pH in the range of from 1 to 7, particularly at a pH in the range of from 2 to 4, more particularly at a pH in the range of from 2 to 3.

The reaction of step (iii) may be monitored by any suitable means, for example by atomic absorption spectroscopy. For example, the uptake of the iron and/or nickel cation by the modified PAN fibres may be monitored by atomic absorption spectroscopy. Typically, the reaction of step (iii) is complete after about 2 hours under the reaction conditions discussed above for step (iii). A typical treatment time for step (iii) is from about 30 minutes to 18 hours, particularly from about 1 to 6 hours, more particularly from about 2 to 3 hours.

Typically, the fabric is washed between each of the steps (i) to (iii) of the method of the present invention. For example, the fabric may be washed with water, for example with distilled water. The washing step substantially removes residual reagents present from the previous reaction step(s). Typically, after step the fibrous catalyst is dried before use. The catalyst may be dried using any conventional means, for example at temperatures up to 105° C.

Any fabric comprising PAN fibres may be used in the present invention. The references herein to a fabric may refer simply to an arrangement of one or more PAN fibres. In one aspect of the invention, the fabric that comprises PAN fibres is a knitted fabric, such as a fibrous knitted mesh. Thus, in this aspect, the PAN fibres/yarn must be capable of being knitted. The knitted fabric may be prepared by any suitable method known in the art. For example, the fabric may be knitted using conventional equipment using the "polufang" (half-cardigan structure) knitting method, which method is identifiable by British Standard 5441:1998 and would be well known to a person skilled in the art.

The PAN fibres may be complex PAN fibres and may be prepared by any suitable method known to a person skilled in the art. For example, the PAN fibres may be prepared according to Russian Standard 6-0602-80.

The fabric may comprise one or more inert mono-fibres in addition to the PAN fibres. The inert mono-fibres preferably should be capable of being knitted and act as a support for the PAN fibres, so as to provide a fibrous catalyst that is self-supporting. Without wishing to be bound by any theory, the inert mono-fibres are not believed to participate directly in any reaction(s) in which the fibrous catalysts are used. The inert mono-fibres may be any suitable fibres known to a person skilled in the art. For example, suitable inert mono-fibres include polypropylene fibres (such as polypropylene fibres made according to Russian Standard 6-06-537-87).

When the knitted fabric comprises one or more inert mono-fibres, any suitable weight ratio of PAN fibres to inert mono-fibres may be used. It is preferred that the knitted fabric comprises a higher proportion of PAN fibres than inert mono-fibres. This is because the inert mono-fibres are not believed to participate in any reaction(s) in which the fibrous catalysts are used. For example, the knitted fabric may comprise the PAN fibres and the inert mono-fibres in a weight ratio in the range of from 90:10 to 10:90, particularly 75:25 to 25:75 and more particularly 60:40 to 40:60.

In one aspect of the invention, there is provided a method for preparing a fibrous catalyst for the treatment of a waste stream, the method comprising the steps of:

(i) treating a fabric comprising polyacrylonitrile fibres with a hydrazine salt selected from hydrazine sulfate and dihydrazine sulfate (especially dihydrazine sulfate) and hydroxylamine sulfate in the presence of a base to provide a modified fabric;

(ii) treating the modified fabric with a base; and (iii) treating the modified fabric with an aqueous solution comprising a sulfate salt of an iron cation and a salt (especially a sulfate, nitrate and/or chloride salt, more especially a sulfate and/or chloride salt, most especially a sulfate salt) of a second metal cation, wherein the second metal cation is selected from a lithium, sodium, potassium, magnesium, calcium and zinc cation, and mixtures thereof.

In another aspect of the invention, there is provided a method for preparing a fibrous catalyst for the treatment of a waste stream, the method comprising the steps of:

(i) treating a fabric comprising polyacrylonitrile fibres with a hydrazine salt selected from hydrazine sulfate and dihydrazine sulfate (especially dihydrazine sulfate) and hydroxylamine sulfate in the presence of a base to provide a modified fabric;

(ii) treating the modified fabric with a base; and (iii) treating the modified fabric with an aqueous solution comprising a sulfate salt of a nickel cation and a salt (especially a sulfate, nitrate and/or chloride salt, more especially a sulfate and/or chloride salt, most especially a sulfate salt) of a second metal cation, wherein the second metal cation is selected from a lithium, sodium, potassium, magnesium, calcium and zinc cation, and mixtures thereof.

In another aspect of the invention, there is provided a method for preparing a fibrous catalyst for the treatment of a waste stream, the method comprising the steps of:

(i) treating a fabric comprising polyacrylonitrile fibres with a hydrazine salt selected from hydrazine sulfate and dihydrazine sulfate (especially dihydrazine sulfate) and hydroxylamine sulfate in the presence of a base to provide a modified fabric;

(ii) treating the modified fabric with a base; and (iii) treating the modified fabric with an aqueous solution comprising a sulfate salt of an iron cation and a sulfate, nitrate and/or chloride salt (especially a sulfate and/or chloride salt, most especially a sulfate salt) of a second metal cation, wherein the second metal cation is selected from a lithium, sodium, potassium and calcium cation, and mixtures thereof (especially the second metal cation may be selected from a lithium, sodium and calcium cation, more especially from a sodium and calcium cation, and mixtures thereof, even more especially the second metal cation may be a sodium cation).

In another aspect of the invention, there is provided a method for preparing a fibrous catalyst for the treatment of a waste stream, the method comprising the steps of:

(i) treating a fabric comprising polyacrylonitrile fibres with a hydrazine salt selected from hydrazine sulfate and dihydrazine sulfate (especially dihydrazine sulfate) and hydroxylamine sulfate in the presence of a base to provide a modified fabric;

(ii) treating the modified fabric with a base; and (iii) treating the modified fabric with an aqueous solution comprising a sulfate salt of a nickel cation and a sulfate, nitrate and/or chloride salt (especially a sulfate and/or chloride salt, most especially a sulfate salt) of a second metal cation, wherein the second metal cation is selected from a lithium, sodium, potassium and calcium cation, and mixtures thereof (especially the second metal cation may be selected from a lithium, sodium and calcium cation, and mixtures thereof, more especially the second metal cation may be a sodium cation).

The method of the present invention may be conducted in any suitable reactor. Preferably, the method is conducted in a suitable dye bath reactor (i.e. a reactor typically used for dying fabric). In particular, the method may be conducted in a commercial dye bath with rollers arranged for passing the fabric through the dye bath in which the treatment(s) are conducted. An example of a suitable dye bath reactor is a URGNANO-BERGAMO MCS, WRT 3 reactor (made in Italy). Typically, a dye bath reactor comprises a cylindrical drum lying on its side and the body of the reactor is made of stainless steel (such as stainless steel 316). Typically, a dye bath reactor is equipped with suitable means for monitoring a reaction, such as a temperature sensor and regulator, a pressure sensor and a flow meter. A dye bath reactor may also include a programmable interface (for example for defining temperature programmes and/or automating the dosage of reagents) and may also include one or more heat exchangers for cooling the reactor when required.

References herein to aqueous solutions are intended to refer to solutions in a suitable solvent or diluent comprising at least 40%, particularly at least 50%, by volume of water. In particular, the solvent or diluent is water. Additionally, the skilled person would appreciate that such solutions include the component(s) thereof (for example metal salt(s)) substantially dissolved therein but that minor amounts of the component(s) may be present as a suspension in the solvent or diluent. Additionally, a proportion of the component(s) may become suspended in the solvent or diluent as the method step(s) of the present invention are conducted.

According to another aspect of the present invention there is provided a fibrous catalyst obtainable by the method of the present invention. According to yet another aspect of the present invention there is provided a fibrous catalyst obtained by the method of the present invention.

The fibrous catalysts made according to the method of the present invention are suitable for treating a waste stream. The references to the treatment of a waste stream are intended to refer to the conversion of an undesired, potentially harmful, "waste" compound contained in the waste stream into a new derivative that typically is at least less harmful and/or easier to dispose of. In some cases, the new derivative formed may be useful in another process and/or application and may be isolated and/or collected for further use. When this is not the case, the new derivative that is formed typically will be collected and/or disposed of in any suitable manner.

Typically, the fibrous catalysts do not convert 100% of the "waste" compound into the new derivative. As the skilled person would appreciate, the percentage conversion will depend on a number of factors, including the particular fibrous catalyst selected and the composition of the waste stream being treated. It is expected that the fibrous catalysts prepared according to the method of the present invention will generally convert from about 50% to about 100% by weight of the "waste" compound into the new derivative.

As discussed above, the method of the present invention provides a fibrous catalyst having increased loading of iron and/or nickel cations fixed to the PAN fibres. It is believed that this increase in loading should increase the number of active sites on the catalyst and hence improve catalytic activity and/or extend the lifetime of the catalyst.

The fibrous catalysts prepared according to the method of the present invention are suitable for treating a wide variety of waste streams comprising virtually any undesired organic compound(s). For example, they may be used to treat waste streams originating from the chemical, pharmaceutical, petroleum chemical, textile, pulp, leather, agro-chemical, furniture manufacturing and photo-processing industries, for example comprising virtually any undesired organic compound(s). In particular, the fibrous catalysts may be used to treat waste streams containing one or more dyes, for example waste streams containing one or more dyes and which originate from the textile or chemical industries.

According to another aspect of the invention, there is provided a kit for providing a fibrous catalyst for the treatment of a waste stream, the kit comprising:
(i) polyacrylonitrile fibres;
(ii) a hydrazine salt;
(iii) a hydroxylamine salt;
(iv) a base;
(v) a sulfate salt of a first metal cation, wherein the first metal cation is selected from an iron and nickel cation, and mixtures thereof; and
(vi) a salt of a second metal cation, wherein the second metal cation is selected from a lithium, sodium, potassium, rubidium, cesium, beryllium, magnesium, calcium, strontium, barium, zinc, cadmium, mercury, aluminium, gallium, indium, thallium, tin, lead, antimony and bismuth cation, and mixtures thereof.

The kit includes those components that are required to provide a fibrous catalyst for the treatment of a waste stream. The PAN fibres, hydrazine salt, hydroxylamine salt, base, sulfate salt of the first metal cation and salt of the second metal cation are as defined above in relation to the method of the present invention. The base is selected so as to provide the desired pH for each step of the method, as necessary. The fibrous catalysts may be prepared from the components of the kit using any suitable method, for example using a method as hereinbefore defined. In one aspect, the kit comprises a sulfate salt of an iron cation. In another aspect, the kit comprises a sulfate salt of a nickel cation.

In one aspect, the kit comprises a hydrazine salt selected from hydrazine dihydrochloride, hydrazine monohydrochloride, hydrazine hydrate, hydrazine monohydrobromide, hydrazine acetate, hydrazine sulfate and dihydrazine sulfate, and mixtures thereof. More especially, the hydrazine salt is selected from hydrazine sulfate and dihydrazine sulfate, and mixtures thereof (even more especially the hydrazine salt is dihydrazine sulfate).

In one aspect, the kit comprises a hydroxylamine salt selected from hydroxylamine monohydrochloride, hydroxylamine sulfate and hydroxylamine phosphate, and mixtures thereof. More especially, the hydroxylamine salt is hydroxylamine sulfate.

In one aspect, the kit comprises a base selected from sodium hydroxide, potassium hydroxide and sodium carbonate, and mixtures thereof.

In one aspect, the kit comprises a salt of a second metal cation, wherein the second metal cation is selected from a sodium, lithium, potassium, calcium, magnesium and zinc cation, and mixtures thereof. Particularly, the second metal cation is selected from a sodium, lithium, potassium and calcium cation, more particularly from a sodium, potassium and calcium cation, even more particularly from a sodium and calcium cation, and mixtures thereof. In another aspect, the second metal cation may be selected from a sodium, lithium and potassium cation, especially from a sodium and potassium cation, and mixtures thereof. In one aspect, the second metal cation is a calcium cation. In another aspect, the second metal cation is a sodium cation. The salts of the second metal cation(s) may comprise any suitable anion, such as chlorides, iodides, bromides, fluorides, sulfates, hydrogen sulfates, carboxylates, thiosulfates, thiocyanates, perchlorates, nitrates and nitrites, particularly chlorides, sulfates, nitrates and nitrites, more particularly chlorides, sulfates and nitrates, even more particularly chlorides and sulfates, and mixtures thereof.

In one aspect, the kit may comprise a sulfate salt of the second metal cation. For example, the salt of the second metal cation may be a sulfate salt of sodium, lithium, potassium and/or calcium (especially sodium), such as $CaSO_4 \cdot 0.5H_2O$, $CaSO_4 \cdot 2H_2O$, $Na_2SO_4$, $Na_2SO_4 \cdot 10H_2O$, $K_2SO_4$, $Li_2SO_4$ and/or $Li_2SO_4 \cdot H_2O$ (such as $CaSO_4 \cdot 0.5H_2O$, $CaSO_4 \cdot 2H_2O$, $Na_2SO_4$, $K_2SO_4$, $Li_2SO_4$ and/or $Li_2SO_4 \cdot H_2O$, especially $Na_2SO_4$ and/or $Na_2SO_4 \cdot 10H_2O$).

In another aspect, the kit may comprise a chloride salt of the second metal cation. For example, the salt of the second metal cation may be a chloride salt of sodium, lithium, potassium and/or calcium (especially sodium), such as $CaCl_2$, $CaCl_2 \cdot 2H_2O$, $CaCl_2 \cdot 6H_2O$, NaCl, LiCl and/or KCl (such as $CaCl_2$, NaCl, LiCl and/or KCl, especially NaCl).

In another aspect, the kit may comprise a nitrate salt of the second metal cation. For example, the salt of the second metal cation may be nitrate salt of sodium, lithium potassium and/or calcium (especially sodium), such as $Ca(NO_3)_2 \cdot 4H_2O$, $NaNO_3$, $LiNO_3$ and/or $KNO_3$ (especially $NaNO_3$).

In another aspect, the kit may comprise a second metal cation salt selected from sodium chloride (NaCl), calcium nitrate tetrahydrate ($Ca(NO_3)_2 \cdot 4H_2O$) and sodium sulfate ($Na_2SO_4$ and/or $Na_2SO_4 \cdot 10H_2O$), and mixtures thereof. In another aspect, the kit may comprise a second metal cation salt selected from sodium chloride (NaCl) and sodium sulfate ($Na_2SO_4$ and/or $Na_2SO_4 \cdot 10H_2O$), and mixtures thereof. Especially, the kit may comprise a second metal cation salt that is sodium sulfate ($Na_2SO_4$ and/or $Na_2SO_4 \cdot 10H_2O$).

According to another aspect of the present invention, there is provided the use of a fibrous catalyst prepared according to the method of the present invention as hereinbefore defined in the treatment of a waste stream. The waste stream may comprise one or more organic compounds, such as one or more organic compounds selected from sulfides, thiols, dyes, phenols (including bisphenols, nonylphenols and aminophenols), amines, phenylenediamine, triethanol amine, ethylenediamine and tetraacetic acid (for example one or more organic compounds selected from sulfides, dyes, phenols, nonylphenols, aminophenols, amines, phenylenediamines, triethanol amine, ethylenediamine and tetraacetic acid). The fibrous catalyst typically is used in the presence of an oxidant.

According to another aspect of the present invention, there is provided a method of treating a waste stream, the method comprising contacting the waste stream with a fibrous catalyst prepared according to the method of the present invention in the presence of an oxidant. According to another aspect of the present invention, there is provided a method of treating a waste stream, the method comprising the steps of preparing a fibrous catalyst according to the method discussed above and of contacting the waste stream with the fibrous catalyst in the presence of an oxidant. The waste stream may comprise one or more organic compounds, such as one or more organic compounds selected from sulfides, thiols, dyes, phenols (including bisphenols, nonylphenols and aminophenols), surfactants, amines, phenylenediamines, triethanol amine, ethylenediamine and tetraacetic acid (for example one or more organic compounds selected from sulfides, dyes, phenols, nonylphenols, aminophenols, amines, phenylenediamines, triethanol amine, ethylenediamine and tetraacetic acid).

Any suitable oxidant may be used in the above described use/method of the present invention. Suitable oxidants include oxygen (such as atmospheric oxygen), ozone and peroxygen compounds (such as hydrogen peroxide). Typically, it is sufficient to contact the waste stream with the fibrous catalyst in air, with the oxygen in the air acting as the oxidant. The oxidant may be delivered using any suitable means. The particular means of delivering the oxidant will depend on the waste stream being treated and the conditions applied. For example, the oxidant may be delivered by bubbling air or oxygen through the waste stream.

The oxidant may, for example, be a peroxygen compound. Examples of suitable peroxygen compounds include hydrogen peroxide, hydrogen peroxide liberating compounds, hydrogen peroxide generating compounds, organic and inorganic peroxyacids and salts thereof, and mixtures thereof. For example, hydrogen peroxide liberating compounds include alkali metal peroxides, organic peroxide bleaching compounds such as urea peroxide and inorganic persalt bleaching compounds such as the alkali metal perborate, percarbonates, perphosphates and persulfates. Organic peroxyacids include compounds containing one or more peroxycarboxyl groups (i.e. —C(O)—O—OH), such as peracetic acid, performic acid and perpropionic acid. Further suitable oxidants include peroxyheptanoic acid, peroxynonanoic acid, perlauric acid, monopergiutaric acid, diperglutaric acid, succinylperoxide, derivatives of perbenzoic acid, magnesium salts of peroxyphthalate, peracid powders (for example made in situ by adding water to mixtures of organic acid reservoirs to hydrogen peroxide reservoirs such as sodium peroxide, benzoyl peroxide, t-butyl hydroperoxide), permanganates such as potassium permanganate, calcium peroxide and monoperoxy-sulfuric acid, and mixtures thereof.

The above described use/method of the present invention may be conducted under any suitable conditions, such as any suitable temperature and pH. As the skilled person would appreciate, the preferred conditions for a particular use/method will depend on a number of factors, such as the particular waste stream being treated and the fibrous catalyst used. Typically, a preferred pH is in the range of from 2 to 12.

Suitably, the fibrous catalyst may be contacted with the waste stream by means of a fluid medium. The fluid medium may be liquid or gaseous. As a person skilled in the art would appreciate, the fluid medium may comprise the waste stream and/or one or more additional solvents and/or carriers.

Typically, the waste stream is in the form of a fluid, which may be liquid or gaseous. In one aspect of the invention, the waste stream is in the liquid phase. For example, the liquid waste stream may be aqueous or organic based. The references herein to liquids include gels and pastes. The references herein to gases include vapours.

The waste stream may originate from any relevant process or industry, for example the waste stream may originate from the chemical, pharmaceutical, petroleum chemical, agrochemical, textile, pulp, leather, furniture manufacturing or photo-processing industry, particularly from the textile or photo-processing industry.

Examples of dyes that may be treated using the fibrous catalyst of the present invention include anthraquinone dyes, such as Acid Blue 45 and Natural Red 4, and azo dyes, such as Cetacid red 4G. Examples of phenol compounds that may be treated using the fibrous catalyst of the present invention include nonylphenol (for example 4-nonylphenol), as well as bisphenols (for example bisphenol A). Examples of sulfide compounds that may be treated using the fibrous catalyst of the present invention include dialkylsulfides (for example diethylsulfide). Examples of thiol compounds that may be treated using the fibrous catalyst of the present invention include alkylthiols (for example ethyl mercaptan and butylmercaptan). Examples of surfactants that can be treated using the fibrous catalyst of the present invention are anionic surfactants (for example dodecylbenzenesulfonate) or non-ionic surfactants, such as alcohol ethoxylates (for example (C9-C11)alkylalcohol ethoxylate)

The invention will now be illustrated by the following non-limiting examples in which, unless stated otherwise:
(a) temperatures are given in degrees Celsius (° C.);
(b) operations were conducted at room or ambient temperature, that is a temperature in the range of from 18 to 25° C., unless otherwise stated;
(c) chemical symbols have their usual meanings;
(d) SI symbols and units are used; and
(e) Ultra-violet/Visible spectra were recorded on a UNI-CAM UV2-100 spectrophotometer.

COMPARATIVE EXAMPLE

Fabric consisting of polyacrylonitrile (PAN) complex fibres and polypropylene (PP) inert mono-fibres was knitted in the same way as reported in GB-A-2,346,569. The fabric was modified in a three-stage process.

At the first treatment stage, 30 g of fabric was immersed into an autoclave containing 800 ml of an aqueous solution of 30 g/l hydrazine dihydrochloride, 42 g/l hydroxylamine monohydrochloride and sodium hydroxide in the amount required for a pH of 9.5. The fabric was maintained at a temperature of from 101 to 102° C. for 2 hours, then it was taken out and washed with distilled water. At the second treatment stage, the fabric was treated for 30 seconds with boiling aqueous sodium hydroxide solution having a concentration of 50 g/l followed by subsequent washing with distilled water. The ratio of the solution mass and knitted mesh mass was equal to 800 ml/30 g. At the third treatment stage, the fabric (30 g) was immersed into 1050 ml of an aqueous metal salts solution containing $FeCl_3.6H_2O$ and either $Ca(NO_3)_2.4H_2O$, $Mg(NO_3)_2.6H_2O$, $Li_2SO_4.H_2O$ or $ZnSO_4.7H_2O$ as described in Table 1 below for 19 hours. The catalyst was then ready to use after washing with distilled water and drying at room temperature.

TABLE 1

Comparative Examples 1 to 12

| Comparative Example | Concentration of the metal in the solution, mmol/(100 ml) | Concentration of the metal on the fibre, mmol/g of fibre |
|---|---|---|
| 1 | $Fe^{3+}$ - 3.19 | 0.115 |
|   | $Ca^{2+}$ - 9.50 | 0.000 |
| 2 | $Fe^{3+}$ - 6.40 | 0.046 |
|   | $Ca^{2+}$ - 6.40 | 0.000 |
| 3 | $Fe^{3+}$ - 9.50 | 0.033 |
|   | $Ca^{2+}$ - 3.19 | 0.000 |
| 4 | $Fe^{3+}$ - 3.19 | 0.115 |
|   | $Ca^{2+}$ - 9.50 | 0.000 |
| 5 | $Fe^{3+}$ - 6.40 | 0.115 |
|   | $Ca^{2+}$ - 11.63 | 0.000 |
| 6 | $Fe^{3+}$ - 6.40 | 0.115 |
|   | $Mg^{2+}$ - 12.45 | 0.000 |
| 7 | $Fe^{3+}$ - 6.40 | 0.078 |
|   | $Li^{+}$ - 11.63 | 0.000 |
| 8 | $Fe^{3+}$ - 6.40 | 0.023 |
|   | $Zn^{2+}$ - 11.63 | 0.090 |
| 9 | $Fe^{3+}$ - 3.19 | 0.386 |
|   | $Li^{+}$ - 19.0 | 0.000 |
| 10 | $Fe^{3+}$ - 3.19 | 0.294 |
|   | $Zn^{2+}$ - 9.50 | 0.180 |
| 11 | $Fe^{3+}$ - 6.40 | 0.051 |
|   | $Ca^{2+}$ - 11.63 | 0.000 |
| 12 | $Fe^{3+}$ - 6.40 | 0.115 |
|   | $Ca^{2+}$ - 9.50 | 0.000 |

Example 1

In Example 1, the fibrous catalyst was prepared in a URG-NANO-BERGAMO MCS, WRT 3 reactor (made in Italy).

This reactor is a model dye bath reactor typically used for the dying of fabric. The reactor is in the form of a cylindrical drum lying on its side.

The body of the reactor is made of stainless steel 316 and the reactor is equipped with a temperature sensor and regulator, pressure sensor and a flow meter. The reactor has a programmable interface (that makes it possible to define temperature programmes and automate the dosage of chemicals) and has heat exchangers for cooling of reactor when required.

Step (i)—Modification

The reagents and quantities used in step (i) are set out in Table 2 below.

TABLE 2

Reagents and Quantities used in Step (i) Modification

| Chemical | Quantity |
| --- | --- |
| Water | 600 L |
| Dihydrazine sulfate | 15.666 kg |
| Hydroxylamine sulfate | 32.478 kg |
| Sodium hydroxide | 22.2695 kg |
| PAN mesh (normal) | 16.75 kg, 25 m long × 2.2 m wide |

The reactor was filled with about 600 L of water. Then 13.9 kg of dihydrazine sulfate and 29.76 kg of hydroxylamine sulfate were added, followed by mixing. The pH of the solution was then adjusted to 9.4 using the side dosage unit. This was achieved by initially putting 19 Kg of NaOH (solid pellets) into the solution, followed by step wise addition of NaOH (solid pellets) accompanied by pH verification until the desired pH was attained. A sample of the start up modifying solution was then collected in order to determine actual initial concentration of reagents (dihydrazine sulfate and hydroxylamine sulfate).

The mesh (which was knitted in the form of a close loop with a radius of about 0.35 m) was first cut to obtain a sheet of width 2.2 m. About 16.75 kg of the mesh was then loaded into the reactor. The reactor was closed and the temperature raised from 26° C. to 100° C. in 33 minutes. The speed of rotation of the mesh in the reactor was set to 150 meters/minute. The temperature of the solution in the reactor was manually maintained at 97 to 102° C. for two hours. The reactor was then cooled for 15 minutes to a temperature of 60° C. Samples of the used solution were collected for analysis, and the reactor was then drained. The maximum pressure during the modification was 6 Psi (0.4 bar).

The mesh was washed in a batch process, four times each with 600 L of water (5 minutes per batch) and liquid samples after each wash were collected. The rotation of the mesh in the reactor during the batch washing process was 145 meters/minute. A qualitative test was used to monitor the amount of hydrazine in solution in order to determine the washing end point. The determination of hydrazine was based on the reaction of hydrazine with 4-dimethylamino benzaldehyde (DAB) to form a yellow dye (Wavelength of maximum absorption in the UV/VIS region for hydrazine/DAB is 425 nm). The test consisted of solutions of 4-dimethyl amino benzaldehyde prepared in the lab and bottled. Solutions of DAB containing known concentrations of hydrazine were pre-prepared to aid visual comparison of colour intensities. After four batch washes, a sample of mesh was collected by cutting across its entire width.

The modification process resulted in an observable change in colour of the mesh from white, through orange to yellow. The colour of the mesh at the end of modification step (i) was very uniform suggesting a homogenous modification of site as well as good mixing.

Step (ii)—Modification

The reagents and quantities used in step (ii) are set out in Table 3 below.

TABLE 3

Reagents and Quantities used in Step (ii) Modification

| Chemical | Quantity |
| --- | --- |
| Water | 600 L |
| Sodium hydroxide | 15 kg |

The mesh was left in position in the reactor after the step (i) modification. The reactor containing the mesh was fed with 600 L of water and the temperature was raised to 50° C. This was followed by the gradual addition of 15 kg of NaOH (solid pellets) by means of the side dosage unit. This process was performed very slowly and with care as NaOH fumes were produced during the exothermic reaction of NaOH and water. The reactor was then heated up to 60° C. and maintained in isothermal conditions (temperature of 60±° C.) for 15 minutes. Washing of the mesh was performed by over flow washing for 20 minutes (i.e. by which a continuous flow of water was washed over the mesh in the reactor whilst the mesh was in constant rotation in the reactor) and a sample of mesh was collected for analysis.

Visual observation of the step (ii) modified mesh showed a very homogenous colour, suggesting a homogenous modification of site as well as good mixing.

Step (iii)—Impregnation

The reagents and quantities used in step (iii) are set out in Table 4 below.

TABLE 4

Reagents used in Step (iii) Impregnation

| Chemical | Quantity |
| --- | --- |
| Water | 600 L |
| Ferric sulfate monohydrate ($Fe_2(SO_4)_3 \cdot H_2O$) | 3.47 kg |
| Calcium nitrate tetrahydrate ($Ca(NO_3)_2 \cdot 4H_2O$) | 13.5 kg |

The reactor was fed with 600 L of water followed by the addition of 3.47 kg of ferric sulfate monohydrate and 13.5 kg of calcium nitrate tetrahydrate. The reactor was closed and the rotation of the mesh set at 140 meters per minute. After a reaction time of one hour, a sample of mesh was collected for analysis. The duration of overall impregnation was 2 hours. After the impregnation process, a liquid sample was collected to analyse the residual iron in solution. The mesh was flow washed for 20 minutes followed by four batch washes of 5 minutes each with a 600 L wash volume. Wash solutions were collected for analysis. The mesh was dried by blowing warm air through at a temperature of about 50° C. The impregnated mesh had a homogeneous colour.

The iron content on the modified and impregnated PAN fibres of the mesh was determined as follows:

The dried mesh was thoroughly washed in the lab until there were no brown spots on drying tissue (brown spots believed to signify leached iron). The total amount of iron found on the modified and impregnated PAN fibres was then determined by removing the fibres from the mesh and desorbing the iron from the fibres in concentrated HCl (37% ACS grade) at 150° C. for 2 hours. This was achieved by putting about 0.1 g of modified and impregnated PAN yarn in reaction vials, followed by the addition of 10 ml of 37% HCl (aqueous). The samples were then heated at 150° C. for 2 hours. The samples were each filtered using Whatman filter paper grade 54 and were then diluted up to 100 ml with distilled water and analysed for iron content by atomic absorption spectroscopy (AAS). The atomic absorption spectrometer used was the Perkin Elmer AAnalyst 200 series equipped with four lamps. The instrument set at a wavelength of 248.33 nm, slit of 1.8/1.35, with air as oxidant at a flow rate of 10.00 L/min, and acetylene at flow rate of 2.50 L/min. The integration time was set to 3 seconds and three replicates of each sample measured. The lamp selected for the analysis was the iron Lamp. The results are presented in Table 5.

It can be seen from a comparison of Tables 1 and 5 that the fibrous catalysts prepared according to the method of the present invention (i.e. using an iron sulfate salt in the impregnation step) provide increased loading of iron on the PAN fibres. Additionally, Table 6 shows that the iron in the fibrous catalysts prepared according to the method of the present invention (i.e. using an iron sulfate salt in the impregnation step) is fixed strongly to the modified fibres.

TABLE 5

Iron concentration on Mesh

| Sample | | | | concentration in solution of | Iron | Average iron |
|---|---|---|---|---|---|---|
| Impregnation time (hours) | Drying details - dried later* or immediately** | Repetition | Weight of fibres [g] | iron removed from fibre [mg] × 10$^2$/L | concentration on fibre [mmol/g of fibre] | concentration on fibre (standard deviation) |
| 2 | later* | 1 | 0.1005 | 2.9300 | 0.5220 | 0.4956 |
| 2 | later* | 2 | 0.1015 | 2.7890 | 0.4920 | (0.0248) |
| 2 | later* | 3 | 0.1021 | 2.6960 | 0.4728 | |
| 2 | immediately** | 1 | 0.1020 | 2.9750 | 0.5222 | 0.5287 |
| 2 | immediately** | 2 | 0.1009 | 3.0900 | 0.5483 | (0.0174) |
| 2 | immediately** | 3 | 0.1014 | 2.9190 | 0.5154 | |

*Sample dried 24 hours after washing
**Sample dried immediately after washings

The mesh that was dried immediately after washing (i.e. without wet storage) has a slightly higher iron content than the mesh that was dried after 24 hours. There is no significant difference in the total iron content between samples impregnated for one hour and those impregnated for two hours. Additionally, there is no significant difference in the amount of iron on the mesh dried immediately and that dried after wet storage.

A comparison of the iron contents shown in Table 5 with the comparative examples shown in Table 1 shows that the mesh impregnated with ferric sulfate (Example 1) has a higher iron content higher than that obtained when the mesh is impregnated using ferric chloride (Comparative Examples 1 to 12).

Results of iron leached after exposure to a 0.05% EDTA sodium salt at pH 5 is presented in Table 6. An iron leaching of 0.0915 mmol/g was obtained for mesh impregnated for two hours and dried immediately, of 0.0935 mmol/g for mesh impregnated for two hours but dried after wet storage for 24 hours and of 0.2747 mmol/g for mesh impregnated for 1 hour and dried after wet storage for 24 hours. There is no significant difference between the meshes impregnated for two hours, with or without wet storage.

Catalytic Activity Testing

The catalyst prepared as described above in Example 1 which had been dried immediately after washing was tested for catalytic activity towards the oxidative decomposition of Bisphenol A (hereinafter "BPA").

The conditions of the decomposition reaction were as follows:

Catalyst to liquor ratio: 1.2 g/50 ml, [BPA] 10 ppm, [$H_2O_2$] 50 ppm, initial pH 3.0, temperature 30° C. The reaction was performed in a carousel reactor (Radleys) equipped with a temperature controller and a magnetic stirrer.

Bisphenol A was quantified by high performance liquid chromatography (HPLC series 200, Perkin Elmer) equipped with column Phenomenex Gemini (C18, 5 μm). Instrumental set up was as follows: mobile phase: acetonitrile/water (70/30 v/v), wavelength 280 nm, flow rate 1.0 mL/min.

Figure 1:
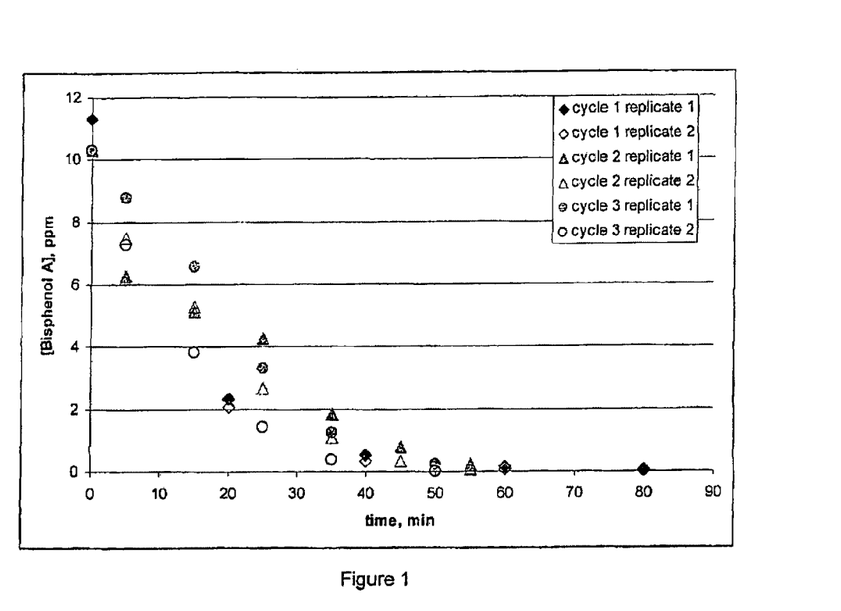
FIG. 1 depicts the results of the activity of the catalyst in the decomposition of bisphenol A in the presence of hydrogen peroxide

Results of the activity of the catalyst in the decomposition of bisphenol A in the presence of hydrogen peroxide are presented in Tables 7 to 9 and in FIG. 1.

TABLE 6

Strength of iron fixation on the mesh

| Sample | | | | Concentration in solution of | | Average value of iron removed |
|---|---|---|---|---|---|---|
| Impregnation time (hours) | Drying details - dried later* or immediately** | Repetition | Weight of fibre [g] | iron removed from fibre by EDTA mg × 10$^2$/L | Iron removed from fibre [mmol/g of fibre] | from fibre [mmol/g of fibre] (standard deviation) |
| 2 | later* | 1 | 0.1006 | 0.5275 | 0.0940 | 0.0935 |
| 2 | later* | 2 | 0.1002 | 0.5205 | 0.0931 | (0.00062) |
| 2 | immediately** | 1 | 0.1008 | 0.5170 | 0.0919 | 0.0915 |
| 2 | immediately** | 2 | 0.1025 | 0.5215 | 0.0912 | (0.00052) |

*Sample dried 24 hours after washing
**Sample dried immediately after washings

TABLE 7

Decomposition of BPA as a function of time in the presence of the catalyst of Example 1 and hydrogen peroxide: Cycle 1

| Time (minutes) | Replicate 1 Concentration of BPA remaining (ppm) | Replicate 2 Concentration of BPA remaining (ppm) | % of BPA decomposed |
|---|---|---|---|
| 0  | 11.34 | 11.34 | 0.0  |
| 20 | 2.31  | 2.08  | 80.0 |
| 40 | 0.51  | 0.33  | 96.0 |
| 60 | 0.15  | 0.07  | 99.0 |
| 80 | 0.04  | 0.01  | 99.8 |

TABLE 8

Decomposition of BPA as a function of time in the presence of the catalyst of Example 1 and hydrogen peroxide: Cycle 2

| Time (minutes) | Replicate 1 Concentration of BPA remaining (ppm) | Replicate 2 Concentration of BPA remaining (ppm) | % of BPA decomposed |
|---|---|---|---|
| 0  | 10.3 | 10.30 | 0.0  |
| 5  | 6.28 | 7.50  | 33.0 |
| 15 | 5.15 | 5.27  | 49.0 |
| 25 | 4.28 | 2.66  | 66.0 |
| 35 | 1.82 | 1.10  | 86.0 |
| 45 | 0.78 | 0.33  | 94.6 |
| 55 | 0.21 | 0.09  | 98.5 |

TABLE 9

Decomposition of BPA as a function of time in the presence of the catalyst of Example 1 and hydrogen peroxide: Cycle 3

| Time (minutes) | Replicate 1 Concentration of BPA remaining (ppm) | Replicate 2 Concentration of BPA remaining (ppm) | % of BPA decomposed |
|---|---|---|---|
| 0  | 10.30 | 10.30 | 0.0  |
| 5  | 8.77  | 7.26  | 22.2 |
| 15 | 6.55  | 3.81  | 49.7 |
| 25 | 3.30  | 1.41  | 77.0 |
| 35 | 1.22  | 0.36  | 92.0 |
| 50 | 0.21  | 0.00  | 99.0 |

FIG. 1 shows the Bisphenol A concentration as a function of time in the presence of the catalyst of Example 1 prepared using iron sulfate/calcium nitrate (all cycles).

Example 2

Mesh modified in steps (i) and (ii) in the reactor as described above in Example 1 were impregnated in the laboratory with a solution of either iron (III) sulfate and sodium chloride, iron (III) sulfate and sodium sulfate or iron(III) chloride and calcium nitrate. The salts used were $Fe_2(SO_4)_3 \cdot H_2O$, $FeCl_3 \cdot 6H_2O$, $NaCl$, $Na_2(SO_4)$, $Ca(NO_3)_2 \cdot 4H_2O$.

Conditions for impregnation were as follows:

Fibre to liquor ratio: 1.2 g in 100 ml, therefore about 2.15 g of mesh was impregnated in 110 ml. Pieces of mesh (2.15 g) containing modified fibres (1.32 g) from step (ii) of the production process were placed in beakers with a solution (110 ml) of either iron (III) sulfate/sodium chloride, iron (III) sulfate/sodium sulfate or iron(III) chloride/calcium nitrate salts, covered with paraffin film and stirred with magnetic stirrer for 2 hours at room temperature. The pH of the solution was not adjusted. After 2 hours mesh samples were removed from the beakers and washed thoroughly with distilled water to ensure removal of all traces of iron solution. The amount of iron (III) present in the solution was 30 mmoles for iron (III) sulfate salts and 27.8 mmol for iron(III) chloride salt.

Table 10 below is for comparative purposes and shows the iron content on mesh samples modified in the reactor in steps (i) and (ii) and impregnated in the laboratory with solutions of iron(III) chloride/calcium nitrate wherein the ratio of the iron salt to the calcium salt is in the molar ratio of 1:3. Duration of impregnation is 2 hours. The method of measuring the iron content is as described above.

TABLE 10

Iron content on mesh* impregnated in laboratory with iron(III) chloride/calcium nitrate

| Sample number | Molar ratio Fe:Ca in impregnation solution | Weight of fibre (g) | Amount of iron dissolved from fibre (mg) | Amount of iron on 1 fibre (mg) | Amount of iron on 1 g of fibre (mmol) | Average amount of iron on 1 g of fibre (mmol) |
|---|---|---|---|---|---|---|
| 1a | 1:3 | 0.0945 | 1.634 | 17.29 | 0.310 | 0.309 |
| 1b | 1:3 | 0.0940 | —     | —     | —     |       |
| 1c | 1:3 | 0.0959 | 1.651 | 17.22 | 0.308 |       |
| 2a | 1:3 | 0.0922 | 1.695 | 18.38 | 0.329 | 0.334 |
| 2b | 1:3 | 0.0930 | 1.740 | 18.71 | 0.335 |       |
| 2c | 1:3 | 0.0959 | 1.814 | 18.91 | 0.339 |       |

*mesh derived from modification in dye bath reactor for steps (i) and (ii)
a, b and c are replicates from the same impregnation batch
1 and 2 are from different impregnation batches Table 11 below shows the iron content on mesh samples modified in the reactor in steps (i) and (ii) and impregnated in the laboratory with solutions of iron(III) sulfate/sodium sulfate wherein the ratio of the iron salt to the sodium salt is in the molar ratio of 1:3 to 1:20. Duration of impregnation is 2 hours. The method of measuring the iron content is as described above.

TABLE 11

Iron content on mesh* impregnated in laboratory with iron(III) sulfate/sodium sulfate

| Sample number | Molar ratio Fe:Na in impregnation solution | Weight of fibre (g) | Amount of Fe dissolved from fibre (mg) | Amount of Fe on 1 g of fibre (mg) | Amount of Fe on 1 g of fibre (mmol) | Average amount of Fe on 1 g of fibre (mmol) |
|---|---|---|---|---|---|---|
| 1a | 1:3  | 0.1053 | 3.941 | 37.43 | 0.670 | 0.654 |
| 1b | 1:3  | 0.1062 | 3.985 | 37.52 | 0.638 |       |
| 2a | 1:3  | 0.1073 | 4.355 | 40.59 | 0.727 | 0.723 |
| 2b | 1:3  | 0.0983 | 3.945 | 40.13 | 0.719 |       |
| 3a | 1:6  | 0.1038 | 3.485 | 33.57 | 0.601 | 0.597 |
| 3b | 1:6  | 0.0958 | 3.170 | 33.09 | 0.592 |       |
| 4a | 1:6  | 0.0967 | 3.638 | 37.62 | 0.674 | 0.680 |
| 4b | 1:6  | 0.0955 | 3.658 | 38.30 | 0.686 |       |
| 5a | 1:12 | 0.0963 | 2.814 | 29.22 | 0.523 | 0.525 |
| 5b | 1:12 | 0.0951 | 2.796 | 29.40 | 0.526 |       |
| 6a | 1:12 | 0.0929 | 3.274 | 35.24 | 0.631 | 0.622 |
| 6b | 1:12 | 0.0942 | 3.220 | 34.18 | 0.612 |       |
| 7a | 1:20 | 0.0952 | 3.218 | 33.80 | 0.605 | 0.602 |
| 7b | 1:20 | 0.0918 | 3.059 | 33.32 | 0.597 |       |
| 8a | 1:20 | 0.0931 | 3.125 | 33.57 | 0.601 | 0.586 |
| 8b | 1:20 | 0.0961 | 3.084 | 32.09 | 0.575 |       |

*mesh derived from modification in dye bath reactor for steps (i) and (ii)
samples a and b are replicates from the same impregnation batch
samples 1, 3, 5 and 7 are a different impregnation batch from samples 2, 4, 6 and 8

Table 12 below shows the iron content on mesh samples modified in the reactor in steps (i) and (ii) and impregnated in the laboratory with solutions of iron(III) sulfate/sodium chloride wherein the ratio of the iron salt to the sodium salt is in the molar ratio of 1:6 to 1:20. Duration of impregnation is 2 hours. The method of measuring the iron content is as described above.

TABLE 12

Iron content on mesh* impregnated in laboratory with iron(III) sulfate/sodium chloride

| Sample number | Molar ratio Fe:Na in impregnation solution | Weight of fibre (g) | Amount of Fe dissolved from fibre (mg) | Amount of Fe on 1 g of fibre (mg) | Amount of Fe on 1 g of fibre (mmol) | Average amount of Fe on 1 g of fibre (mmol) |
|---|---|---|---|---|---|---|
| 1a | 1:3  | 0.0978 | 3.611 | 36.92 | 0.661 | 0.661 |
| 1b | 1:3  | 0.1004 | —     | —     | —     |       |
| 2a | 1:3  | 0.0960 | 3.679 | 38.32 | 0.686 | 0.678 |
| 2b | 1:3  | 0.0945 | 3.534 | 37.39 | 0.670 |       |
| 3a | 1:6  | 0.0973 | 3455  | 35.51 | 0.636 | 0.640 |
| 3b | 1:6  | 0.1003 | 3.606 | 35.95 | 0.644 |       |
| 4a | 1:6  | 0.0962 | 3.566 | 37.07 | 0.664 | 0.662 |
| 4b | 1:6  | 0.1005 | 3.700 | 36.82 | 0.659 |       |
| 5a | 1:10 | 0.0977 | 2.441 | 24.98 | 0.447 | 0.463 |
| 5b | 1:10 | 0.0961 | 2.565 | 26.69 | 0.478 |       |
| 6a | 1:10 | 0.0950 | 2.401 | 25.28 | 0.453 | 0.458 |
| 6b | 1:10 | 0.1026 | 2.651 | 25.83 | 0.463 |       |

*mesh derived from modification in dye bath reactor for steps (i) and (ii)
samples a and b are replicates from the same impregnation batch
samples 1, 3, 5 and 7 are a different impregnation batch from samples 2, 4, 6 and 8

From Tables 10 to 12 it can be seen that increased iron content is achieved using iron sulfate in comparison to iron chloride as an impregnation salt and that this is enhanced using sodium in comparison to calcium as the second cation. Suitable molar ratios of iron to second metal cation are 1:3 to 1:6.

Example 3

In Example 3, the fibrous catalyst was prepared in a URG-NANO-BERGAMO MCS, WRT 3 reactor (made in Italy) as described in Example 1. Steps (i) and (ii) are the same as described in Example 1 and step (iii) described below is an impregnation with a mixture of iron (III) sulfate monohydrate and sodium sulfate decahydrate.

Step (iii)—Impregnation

The reagents and quantities used in step (iii) are set out in Table 13 below.

TABLE 13

Reagents used in Step (iii) Impregnation

| Chemical | Quantity |
| --- | --- |
| Water | 600 L |
| Ferric sulfate monohydrate | 3.47 kg |
| Sodium sulfate decahydrate | 8.88 kg |

The reactor was fed with 600 L of water followed by the addition of 3.47 kg of ferric sulfate monohydrate and 8.88 kg of sodium sulfate decahydrate. The reactor was closed and the rotation of the mesh set at 140 meters per minute. After a reaction time of one hour, a sample of mesh was collected for analysis. The duration of overall impregnation was 2 hours. After the impregnation process, a liquid sample was collected to analyse the residual iron in solution. The mesh was flow washed for 20 minutes followed by four batch washes of 5 minutes each with a 600 L wash volume. Wash solutions were collected for analysis. The mesh was dried by blowing warm air through at a temperature of about 50° C. The impregnated mesh had a homogeneous colour.

The iron content on the modified and impregnated PAN fibres of the mesh was determined as for Example 1 above and the results are presented in Table 14. Results of iron leached after exposure to a 0.05% EDTA sodium salt at pH 5 is also presented in Table 14. An iron leaching of 0.0495 mmol/g yarn was obtained for mesh impregnated for two hours and dried immediately.

TABLE 14

Iron fixation and loading

| Sample | Total Fe (mmol/g yarn) | Leached iron (mmol/g yarn) | % iron leached |
| --- | --- | --- | --- |
| Example 3 | 0.6718 (0.0069*) | 0.0495 (0.0009*) | 7.3634 |

*standard deviation

A comparison of the iron content shown in Table 14 with those of the Comparative Examples (1 to 12) in Table 1 shows that the mesh impregnated with iron sulfate/sodium sulfate has a higher iron content higher than that obtained when the mesh is impregnated using iron chloride and either calcium nitrate, magnesium nitrate, lithium nitrate or zinc nitrate. A comparison of the iron content shown in Table 14 with that of Example 1 shown in Table 5 shows that the mesh impregnated with iron sulfate/sodium sulfate has a higher iron content than that obtained when the mesh is impregnated using iron sulfate/calcium nitrate (i.e. in Example 1). A comparison of Tables 1 and 5 shows that the fibrous catalyst prepared according to the method of the present invention (i.e. using an iron sulfate salt in the impregnation step) provides increased loading of iron on the (modified) PAN fibres. Additionally, Table 14 shows that the iron in the fibrous catalysts prepared according to the method of the present invention (especially using an iron sulfate and sodium sulfate salts in the impregnation step) is fixed strongly to the modified fibres.

Catalytic Activity Testing

Figure 2:
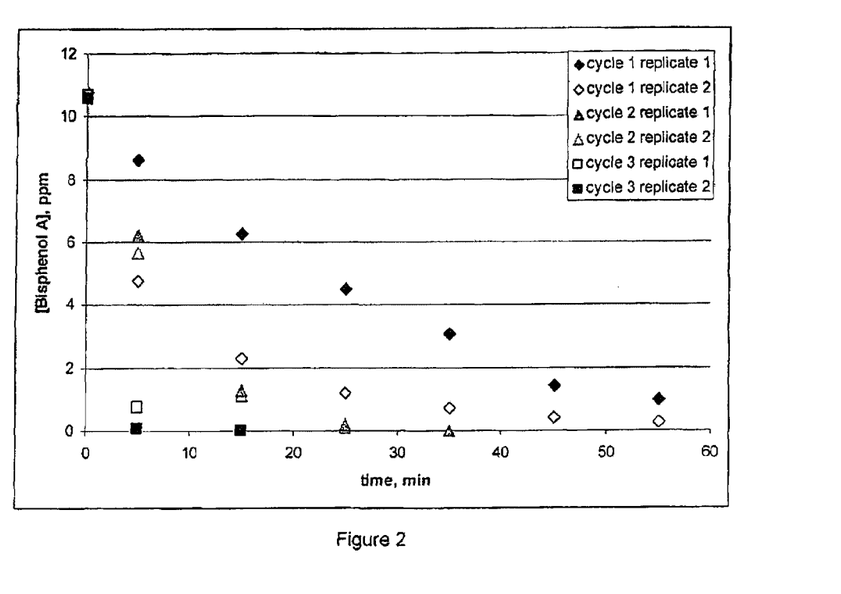
FIG. 2 depicts the bisphenol A concentration as a function of time in presence of the catalyst of Example 3 prepared using iron sulfate/sodium sulfate (all cycles).

Testing for catalytic activity of the mesh prepared according to Example 3 was performed as described in Example 1 and the result shown in Tables 15 to 17 and FIG. 2.

TABLE 15

Decomposition of BPA as a function of time in the presence of the catalyst of Example 3 and hydrogen peroxide: Cycle 1

| Time (minutes) | Replicate 1 Concentration of BPA remaining (ppm) | Replicate 2 Concentration of BPA remaining (ppm) | % of BPA decomposed |
| --- | --- | --- | --- |
| 0 | 10.75 | 10.75 | 0.0 |
| 5 | 8.62 | 4.78 | 37.7 |
| 15 | 6.26 | 2.30 | 60.2 |
| 25 | 4.51 | 1.21 | 73.4 |
| 35 | 3.09 | 0.70 | 82.4 |
| 45 | 1.44 | 0.42 | 91.3 |
| 55 | 0.98 | 0.26 | 94.2 |

TABLE 16

Decomposition of BPA as a function of time in the presence of the catalyst of Example 3 and hydrogen peroxide: Cycle 2

| Time (minutes) | Replicate 1 Concentration of BPA remaining (ppm) | Replicate 2 Concentration of BPA remaining (ppm) | % of BPA decomposed |
| --- | --- | --- | --- |
| 0 | 10.75 | 10.75 | 0.0 |
| 5 | 6.23 | 5.66 | 45.2 |
| 15 | 1.28 | 1.13 | 88.8 |
| 25 | 0.19 | 0.12 | 98.6 |
| 35 | 0 | 0 | 100.0 |

TABLE 17

Decomposition of BPA as a function of time in the presence of the catalyst of Example 3 and hydrogen peroxide: Cycle 3

| Time (minutes) | Replicate 1 Concentration of BPA remaining (ppm) | Replicate 2 Concentration of BPA remaining (ppm) | % of BPA decomposed |
| --- | --- | --- | --- |
| 0 | 10.68 | 10.57 | 0.0 |
| 5 | 0.74 | 0.09 | 96.0 |
| 15 | 0 | 0 | 100.0 |

FIG. 2 shows the bisphenol A concentration as a function of time in presence of the catalyst of Example 3 prepared using iron sulfate/sodium sulfate (all cycles).

Example 4

The catalyst as prepared in Example 1 (dried immediately) was tested for its activity in the gas phase decomposition of ethyl mercaptan with hydrogen peroxide as oxidant. The initial concentration of ethyl mercaptan was 230 mg $CH_3CH_2SH/m^3$ air obtained by the injection of 1 mL of master gas mixture of concentration 14000 mg $CH_3CH_2SH/m^3$ air into the batch reactor of volume 60 mL. The reactor contained 0.13 g (0.52 mmol Fe/g fibre) of catalytic mesh (50% catalytic fibres—50% PPE scaffold) of the catalyst described in Example 1. In addition the reactor contained 4 μL $H_2O_2$ (30% w/w). The molar ratio Fe:$CH_3CH_2SH$ was 300.4:1 and a molar ratio of [Fe]:[$H_2O_2$] of 1:0.522 The reactor was kept at a temperature of 45° C. A control was conducted as described above but without the presence of the catalyst.

TABLE 18

Decomposition of Ethyl Mercaptan (ETSH) in the presence and absence of the catalyst of Example 1 and formation of the oxidation product diethyldisulfide (DEDS)

| | Control | | | Catalyst | | |
|---|---|---|---|---|---|---|
| Time (hours) | ETSH concentration (mg/m$^3$ air) | % D | DEDS concentration (mg/m$^3$ air) | ETSH concentration (mg/m$^3$ air) | % D | DEDS concentration (mg/m$^3$ air) |
| 0 | 189.4 | 0 | 0 | 186.9 | 0 | 20.6 |
| 0.5 | 137.6 | 27.3 | 57.5 | 39.7 | 78.7 | 57.4 |
| 1 | 121.8 | 35.7 | 51.9 | 32.8 | 82.4 | 62.5 |
| 1.5 | 101.0 | 46.7 | 39.6 | 9.5 | 94.9 | 68.3 |
| 2 | 93.9 | 50.4 | 38.6 | 5.2 | 97.2 | 66.1 |
| 2.5 | 87.0 | 54.1 | 33 | 2.6 | 98.6 | 59.2 |
| 3 | 82.5 | 56.4 | 30.0 | 1.5 | 99.1 | 56.4 |

% D is % of ETSH decomposed

Table 14 shows the catalytic activity of the catalyst of Example 1 (prepared in the dye bath reactor using ferric sulfate/calcium nitrate as impregnation mixture) together with hydrogen peroxide obtained 99% conversion of ethyl mercaptan within 3 hours, whereas hydrogen peroxide alone obtained a conversion of only 56%. A higher yield of the oxidation product diethyldisulfide was also obtained when the catalyst was used with hydrogen peroxide than when hydrogen peroxide was used alone.

The invention claimed is:

1. A method for preparing a fibrous catalyst for the treatment of a waste stream, the method comprising the steps of:
   (i) treating a fabric comprising polyacrylonitrile fibers with a hydrazine salt and a hydroxylamine salt in the presence of a base to provide a modified fabric;
   (ii) treating the modified fabric with a base; and
   (iii) treating the modified fabric with an aqueous solution comprising a sulfate salt of a first metal cation and a sulfate salt of a second metal cation, wherein the first metal cation is selected from an iron and nickel cation, and mixtures thereof to be loaded onto the modified fabric, and wherein the second metal cation is selected from a lithium, sodium, potassium, rubidium, caesium, beryllium, magnesium, calcium, strontium, barium, zinc, cadmium, mercury, aluminium, gallium, indium, thallium, tin, lead, antimony and bismuth cation, and mixtures thereof,
   wherein the resultant fibrous catalyst prepared according to steps (i) to (iii) is loaded with the first metal cation, has an enhanced first metal cation loading and provides an enhanced catalytic activity.

2. A method according to claim 1, wherein the first metal cation is an iron cation.

3. A method according to claim 1, wherein the hydrazine salt is selected from hydrazine dihydrochloride, hydrazine monohydrochloride, hydrazine hydrate, hydrazine monohydrobromide, hydrazine acetate, hydrazine sulfate and dihydrazine sulfate, and mixtures thereof.

4. A method according to claim 1, wherein the hydroxylamine salt is selected from hydroxylamine monohydrochloride, hydroxylamine sulfate and hydroxylamine phosphate, and mixtures thereof.

5. A method according to claim 1, wherein step (i) is conducted at a pH in the range of from 6.5 to 12.

6. A method according to claim 1, wherein in step (ii) the base is selected from sodium hydroxide, potassium hydroxide and sodium carbonate, and mixtures thereof.

7. A method according to claim 1, wherein the second metal cation is selected from a sodium, lithium, potassium, calcium and magnesium cation, and mixtures thereof.

8. A method according to claim 1, wherein the fabric is a knitted fabric.

9. A method according to claim 1, wherein the fabric comprises polyacrylonitrile fibers and one or more inert monofibers.

10. A method according to claim 1, wherein steps (i), (ii) and (iii) are conducted in a dye bath reactor.

11. The method of claim 7, wherein the second metal cation is selected from a sodium, potassium and calcium cation, and mixtures thereof.

12. The method of claim 7, wherein the second metal cation is a sodium cation.

* * * * *